(12) United States Patent
Liu et al.

(10) Patent No.: US 11,314,897 B2
(45) Date of Patent: Apr. 26, 2022

(54) DATA IDENTIFICATION METHOD, APPARATUS, DEVICE, AND READABLE MEDIUM

(71) Applicant: Alipay (Hangzhou) Information Technology Co., Ltd., Zhejiang (CN)

(72) Inventors: Jiawei Liu, Zhejiang (CN); Desheng Wang, Zhejiang (CN); Peng Zhang, Zhejiang (CN); Qian Zhang, Zhejiang (CN); Xi Jia, Zhejiang (CN); Yang Liu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/362,022

(22) Filed: Jun. 29, 2021

(65) Prior Publication Data

US 2022/0027514 A1 Jan. 27, 2022

(30) Foreign Application Priority Data

Jul. 24, 2020 (CN) .......................... 202010722262.4

(51) Int. Cl.
| | |
|---|---|
| *G06K 9/00* | (2006.01) |
| *G06F 21/62* | (2013.01) |
| *G06F 17/16* | (2006.01) |
| *G06N 7/00* | (2006.01) |
| *G06K 9/62* | (2022.01) |

(Continued)

(52) U.S. Cl.
CPC .......... *G06F 21/6254* (2013.01); *G06F 7/023* (2013.01); *G06F 7/76* (2013.01); *G06F 17/16* (2013.01); *G06K 9/6215* (2013.01); *G06N 7/005* (2013.01)

(58) Field of Classification Search
CPC ........ G06F 21/6254; G06F 7/023; G06F 7/76; G06F 17/16; G06K 9/6215; G06N 7/005
See application file for complete search history.

(56) References Cited

U.S. PATENT DOCUMENTS

2019/0114512 A1 4/2019 Han et al.

FOREIGN PATENT DOCUMENTS

| CN | 102077580 A | 5/2011 |
|---|---|---|
| CN | 107526967 A | 12/2017 |

(Continued)

*Primary Examiner* — Tom Y Lu
(74) *Attorney, Agent, or Firm* — Seed IP Law Group, LLP

(57) ABSTRACT

Implementations of the present specification disclose a data identification method, apparatus, device, and a computer-readable medium. A solution includes: obtaining a first data set, data samples in the first data set being at least a part of data of a to-be-identified field; obtaining a state transition matrix set generated based on statistics of data samples in a second data set, a data type of the data samples in the second data set being known; determining sample state transition probabilities corresponding to the data samples in the first data set based on the state transition matrix set; determining a ratio between a number of data samples in the first data set whose sample state transition probabilities are greater than a first threshold and a total number of the data samples in the first data set; and determining data corresponding to the to-be-identified field as being of a same data type as the data samples in the second data set in response to that the ratio is greater than a second threshold.

30 Claims, 3 Drawing Sheets

(51) Int. Cl.
*G06F 7/76* (2006.01)
*G06F 7/02* (2006.01)

(56) References Cited

FOREIGN PATENT DOCUMENTS

| | | | | |
|---|---|---|---|---|
| CN | 111382246 A | * | 12/2018 | ............ H04M 3/527 |
| CN | 110852442 A | | 2/2020 | |
| CN | 111368980 A | * | 7/2020 | ............... G06N 3/08 |
| EP | 2246807 A1 | * | 3/2010 | ........... G06F 16/739 |

* cited by examiner

DATA IDENTIFICATION METHOD, APPARATUS, DEVICE, AND READABLE MEDIUM

BACKGROUND

Technical Field

The present application relates to the field of computer technologies, and in particular, to a data identification method, apparatus, device, and a computer-readable medium.

Description of the Related Art

In the existing technologies, when data of target types is desired to be identified, built-in rules corresponding to the target types usually can be used for identification, and the built-in rules can be specific regular expressions or pre-trained multi-classification models. However, because these pre-prepared or pre-trained built-in rules cannot cover all data types, target data cannot be identified when the data that users want to identify does not have corresponding predetermined built-in rules.

Therefore, a data identification method that can adapt to user demand and has a broad scope of application needs to be provided.

BRIEF SUMMARY

Implementations of the present specification provide a data identification method, apparatus, and a device, and a computer-readable medium, to provide a data identification solution that can adapt to user demand and has a broad scope of application.

To resolve the above technical issues, the implementations of the present specification are provided as follows.

A data identification method provided in an implementation of the present specification includes: obtaining a first data set, data samples in the first data set being at least a part of data of a to-be-identified field; obtaining a state transition matrix set generated based on statistics of data samples in a second data set, a data type of the data samples in the second data set being known, the state transition matrix set including a plurality of state transition matrices, and one state transition matrix thereof being used to represent probabilities of various state transition conditions of a value of a first character at one character position relative to a value of a second character at a next character position of the one character position in the data samples in the second data set; determining sample state transition probabilities corresponding to the data samples in the first data set based on the state transition matrix set, the sample state transition probabilities representing a similarity between a data type of the corresponding data samples and the data type of the data samples in the second data set; determining a ratio between a number of data samples in the first data set whose sample state transition probabilities are greater than a first threshold and a total number of the data samples in the first data set; and determining data corresponding to the to-be-identified field as being of a same data type as the data samples in the second data set in response to that the ratio is greater than a second threshold.

A data identification apparatus provided in an implementation of the present specification includes: a first data set acquisition module, configured to obtain a first data set, data samples in the first data set being at least a part of data of a to-be-identified field; a state transition matrix set acquisition module, configured to obtain a state transition matrix set generated based on statistics of data samples in a second data set, a data type of the data samples in the second data set being known, the state transition matrix set including a plurality of state transition matrices, and one state transition matrix thereof being used to represent probabilities of various state transition conditions of a value of a first character at one character position relative to a value of a second character at a next character position of the one character position in the data samples in the second data set; a sample state transition probability determining module, configured to determine sample state transition probabilities corresponding to the data samples in the first data set based on the state transition matrix set, the sample state transition probabilities representing a similarity between a data type of the corresponding data samples and the data type of the data samples in the second data set; a first determining module, configured to determine a ratio between a number of data samples in the first data set whose sample state transition probabilities are greater than a first threshold and a total number of the data samples in the first data set; and a second determining module, configured to determine data corresponding to the to-be-identified field as being of a same data type as the data samples in the second data set in response to that the ratio is greater than a second threshold.

A data identification device provided in an implementation of the present specification includes: at least one processor; and a memory communicatively connected to the at least one processor, the memory storing an instruction that can be executed by the at least one processor, and the instruction being executed by the at least one processor so that the at least one processor can: obtain a first data set, data samples in the first data set being at least a part of data of a to-be-identified field; obtain a state transition matrix set generated based on statistics of data samples in a second data set, a data type of the data samples in the second data set being known, the state transition matrix set including a plurality of state transition matrices, and one state transition matrix thereof being used to represent probabilities of various state transition conditions of a value of a first character at one character position relative to a value of a second character at a next character position of the one character position in the data samples in the second data set; determine sample state transition probabilities corresponding to the data samples in the first data set based on the state transition matrix set, the sample state transition probabilities representing a similarity between a data type of the corresponding data samples and the data type of the data samples in the second data set; determine a ratio between a number of data samples in the first data set whose sample state transition probabilities are greater than a first threshold and a total number of the data samples in the first data set; and determine data corresponding to the to-be-identified field as being of a same data type as the data samples in the second data set in response to that the ratio is greater than a second threshold.

A computer-readable medium provided in an implementation of the present specification stores a computer-readable instruction, where the computer-readable instruction can be executed by a processor to implement a data identification method.

According to at least one implementation of the present specification, a state transition matrix set of a second data set of a known data type is obtained, and sample state transition probabilities of data samples in a first data set corresponding to a to-be-identified field are calculated based on the state transition matrix set. Therefore, in response to that a ratio between the number of data samples, whose sample state transition probabilities meet a first threshold, and the size of the first data set reaches a second threshold, the data samples in the first data set are determined as the known data type, and all data corresponding to a field to which the data samples in the first data set belong is determined as the known data type. In this solution, because a data type of to-be-identified data is identified based on statistical information of data of a known data type, data labeling does not need to be pre-performed, and an identification rule does not need to be pre-written or a related model does not need to be pre-trained. Therefore, this solution has a broad scope of application and consumes less human and computer resources.

BRIEF DESCRIPTION OF THE SEVERAL VIEWS OF THE DRAWINGS

To describe the technical solutions in the implementations of the present specification or in the existing technologies more clearly, the following is a brief introduction of the accompanying drawings for illustrating such technical solutions. Clearly, the accompanying drawings described below are merely some implementations of the present application, and a person skilled in the art can derive other drawings from such accompanying drawings without making innovative efforts.

DETAILED DESCRIPTION

Figure 1:
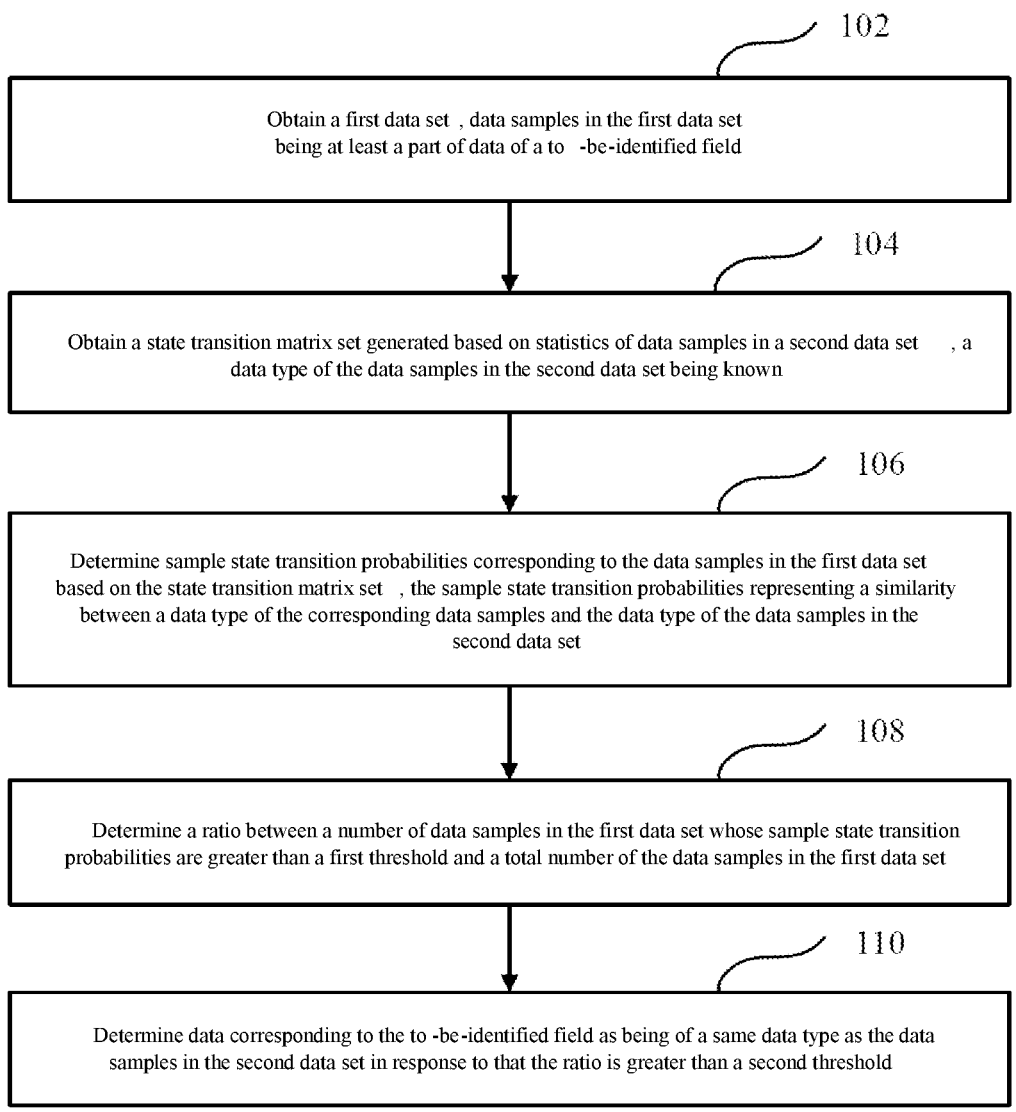
FIG. 1 is a schematic flowchart illustrating a data identification method according to an implementation of the present specification.

Currently, when a data type of target data is to be identified, a user can use a corresponding predetermined regular expression or a pre-trained multi-classification model for identification. In implementations of the present application, the user is a person who wants to identify the target data.

A regular expression constructs a single character string to describe and match a series of character strings that conform to a certain syntax rule based on an agreed syntax rule. For example, a mobile phone number can be represented by a regular expression "^1[3-9][0-9]{9}$", and data that matches this regular expression can be identified as a mobile phone number. Currently, a rule developer can write a corresponding rule for a common data type, and build in a predetermined rule for a user to use. However, because the built-in rule cannot cover all data types, the built-in rule has a very limited application scope. When a data type that the user wants to identify does not have a corresponding predetermined rule, user demand cannot be met. Moreover, writing of the built-in rule requires participation of a professional and consumes a lot of human resources.

A method for identifying a data type of target data based on a multi-classification model is one of supervised learning methods. Data of known data types needs to be pre-collected as training data, the data of the known data types are labeled, and the multi-classification model is trained by a machine training or deep learning algorithm; and then, data that needs to be detected is identified by using the multi-classification model, and a type with a largest posteriori probability is output as a data type of to-be-identified data. In the data type identification method based on training of the multi-classification model, data needs to be pre-labeled, causing consumption on human resources. In addition, the training of the multi-classification model needs more GPU or CPU resources. Moreover, because a relatively long time is taken for pre-training the model, user demand cannot be met when a data type that the user wants to identify does not have a corresponding pre-trained model.

The above existing solutions for identifying a data type of target data are all passive identification solutions because of a large amount of resource consumption, a limited application scope, and the like. Passive identification can mean that, in a case in which a developer provides a rule or model for identifying data of a certain type or a plurality of types, a user can use a pre-configured rule or model directly when the user wants to identify data of a certain type from a database. Clearly, when using a passive identification service, the user can only identify a data type covered by an existing rule or model, and cannot identify a data type that cannot be covered by the existing rule or model, thus user demand cannot be met.

In an implementation of the present application, a data identification solution is provided, for example, a data type identification solution with a broad scope of application is provided. This data type identification solution is not only applicable to the passive identification, but also applicable to active identification. The active identification can mean that a user implements data identification in a case in which an identification model (such as a regular rule, a multi-classification model, or a predictive model) for identifying data of a certain type is not pre-trained and provided. A main procedure for performing data active identification can include: a user actively specifies certain data in a database as data of a known type, and the algorithm or model described in the implementations of the present application can learn to obtain a certain mode based on the specified data, thereby screening out data having a mode similar to or the same as the specified data.

A data identification method provided in the implementations of the present application belongs to an unsupervised learning method. A training sample does not need to be pre-labeled, and input data is automatically classified or grouped based on a statistical method. The solution has low complexity, low dependence on human resources and calculation resources, and high efficiency. The solution can be applied to active identification and passive identification, and has a broad application scenario and scope.

To make purposes, technical solutions, and advantages of one or more implementations of the present specification clearer, the following clearly and completely describes the technical solutions in the one or more example implementations of the present specification and the corresponding accompanying drawings. Clearly, the described implementations are merely some but not all of the implementations of the present specification. Based on the implementations of the present specification, all other implementations derived by a person skilled in the art without making innovative efforts shall fall within the protection scope of the one or more implementations of the present specification.

It should be understood although the terms such as first, second, and third can be used to describe various types of information in the present specification, such information should not be limited to these terms. These terms are used only to differentiate information of a same type.

The following describes in detail the technical solutions provided in the implementations of the present specification with reference to the accompanying drawings.

FIG. 1 is a schematic flowchart illustrating a data identification method according to an implementation of the present specification. From a program point of view, an execution body of a procedure can be a program mounted on an application server or an application terminal.

As shown in FIG. 1, the procedure can include the following steps.

Step 102. Obtain a first data set, data samples in the first data set being at least a part of data of a to-be-identified field.

The first data set can be a set of to-be-identified data, and the to-be-identified field can be a field to which the to-be-identified data belongs.

In the implementation of the present application, a data type of at least a part of data of a certain field in a database is identified, so that a data type of the field can be identified. Therefore, all data of the field is considered to belong to the data type. Identifying the to-be-identified field based on at least a part of the data of the to-be-identified field instead of directly using all of the data saves calculation resources and improves identification efficiency.

In some embodiments, not less than a predetermined amount of data of the to-be-identified field can be obtained as the first data set; not less than a predetermined ratio of data of the to-be-identified field can be obtained as the first data set; or data not less than a predetermined amount and a predetermined ratio of that of the to-be-identified field can be obtained as the first data set. In the above example solution, a number of actually identified samples is set to be not less than the predetermined number and/or the predetermined ratio, thereby further improving accuracy of a judgment result of a data type of the to-be-identified field that is obtained based on these samples.

Step 104. Obtain a state transition matrix set generated based on statistics of data samples in a second data set, a data type of the data samples in the second data set being known, the state transition matrix set including a plurality of state transition matrices, and one state transition matrix thereof being used to represent probabilities of various state transition conditions of a value of a first character at one character position relative to a value of a second character at a next character position of the one character position in the data samples in the second data set.

In the present application, data can be identified based on statistical information of a sample. For example, whether to-be-identified data is data of a known data type can be determined based on the data of the known data type by calculating statistical information of dependency between characters in the data samples.

In the implementation of the present application, one state transition matrix set can be generated based on statistics of all data samples in one second data set. One state transition matrix set can include a plurality of state transition matrices.

State can refer to a character value in a data sample. State transition can refer to a change condition from a character value at one character position to a character value at another character position in a data sample, and the another character position can be a next character position (or a latter character position) of the one character position. Values in the state transition matrix can be used to represent statistical information of change conditions from character values corresponding to data samples at one character position to character values corresponding to the data samples at another character position.

In the implementation of the present application, sample lengths of all data samples in one second data set can be equal, that is, numbers of characters included in data samples in one second data set are equal. As such, one state transition matrix in the state transition matrix set corresponding to the second data set can correspond to one character position of the data samples in the second data set. For example, one state transition matrix can correspond to probabilities of various state transition conditions of a value of a character at one character position relative to a value of a character at another character position in a data sample.

Step 106. Determine sample state transition probabilities corresponding to the data samples in the first data set based on the state transition matrix set, the sample state transition probabilities representing a similarity between a data type of the corresponding data samples and the data type of the data samples in the second data set.

In the implementation of the present application, probabilities of various state transition conditions corresponding to character positions that are obtained based on statistics of a second data set of a known data type are used as probabilities of various state transition conditions corresponding to character positions of any data of the known data type. For any data sample in the first data set, state transition probability values corresponding to character positions of the data sample can be determined based on actual state transition conditions corresponding to the character positions of the data sample, so as to obtain a sample state transition probability of the data sample. In fact, because the probabilities of the various state transition conditions are obtained based on the statistics of the second data set, a sample state transition probability corresponding to a to-be-identified data sample that is calculated based on the obtained probabilities of the various state transition conditions can be used to represent a similarity between the to-be-identified data sample and the data type of the data samples in the second data set.

Step 108. Determine a ratio between a number of data samples in the first data set whose sample state transition probabilities are greater than a first threshold and a total number of the data samples in the first data set.

Step 108 can include: determining whether the sample state transition probability corresponding to each data sample in the first data set is greater than the first threshold, and determining the data sample as a pre-identified data sample in response to that the sample state transition probability corresponding to each data sample in the first data set is greater than the first threshold; counting a number of data samples that are determined as pre-identified data samples as a first number; and calculating a ratio between the first number and the total number of the data samples in the first data set.

Step 110. Determine data corresponding to the to-be-identified field as being of a same data type as the data samples in the second data set in response to that the ratio is greater than a second threshold.

Step 110 can include: determining whether the ratio between the first number and the total number of the data samples in the first data set is greater than the second threshold, determining the data samples in the first data set as data of the known data type in response to that the ratio between the first number and the total number of the data samples in the first data set is greater than the second threshold, and determining the to-be-identified field as a field of the known data type; or determining that the data samples in the first data set are not data of the known data type in response to that the ratio between the first number and the total number of the data samples in the first data set is not greater than the second threshold, and determining that the to-be-identified field is not a field of the known data type.

It should be understood that an order of some steps in the method described in one or more implementations of the present specification can be interchanged based on an actual need, or some steps can be omitted or deleted.

According to the method in FIG. 1, a state transition matrix set is obtained based on statistics of a second data set of a known data type, and sample state transition probabilities of data samples in a first data set corresponding to a to-be-identified field are calculated based on character state transition probability values in the state transition matrix set. Therefore, in response to that a ratio between the number of data samples, whose sample state transition probabilities meet a first threshold, and the size of the first data set reaches a second threshold, the data samples in the first data set are determined as the known data type, and data corresponding to a field to which the data samples in the first data set belong is determined as the known data type. In this solution, because a data type of a to-be-identified data sample is identified based on statistical information of a data sample of a known data type, data labeling does not need to be pre-performed, and an identification rule does not need to be pre-written or a related model does not need to be pre-trained. Therefore, this solution has a broad scope of application and consumes less human and computer resources.

Based on the method in FIG. 1, the implementations of the present specification further provide some example implementation solutions of the method, which are described below.

In the implementations of the present application, a data type is identified based on statistical information of a character transition condition of a data sample. Data statistic information can be pre-extracted, and then used based on a passive identification procedure, or can be embedded in an active identification procedure. A broad scope of application can be achieved, including applying to identification of data of a user-selected type.

In some embodiments, the method can further include: before the obtaining the state transition matrix set generated based on the statistics of the data samples in the second data set (step 104), determining state transition matrices corresponding to character positions based on the data samples in the second data set to obtain the state transition matrix set.

The solution according to the implementations of the present application can be applied to a user active identification scenario. From a user point of view, data of some known types can be specified as the second data set. From a program point of view, a second data set specified by a user can be obtained and statistic information of the second data set is determined, and steps 102 to 110 are performed to determine data and a field in a database that are of the same data type as the selected data set.

In the above user active identification scenario, steps of obtaining the second data set and calculating the statistic information of the second data set can be sequentially performed with steps 102 to 110 on a same device, and for example, can be sequentially performed in a process in which the user performs data identification.

In conventional data identification solutions, in a regular rule-based identification method, a rule for data of a specific type needs to be pre-written; and in a multi-classification model-based identification method, a large amount of data samples need to be pre-labeled and a model needs to be pre-trained. These solutions can be applied only to a passive identification scenario. However, the solution according to the implementations of the present application belongs to an unsupervised solution. Even if there is no pre-written regular rule or pre-trained multi-classification model, data of a similar model can be easily identified based on data of a known type selected by a user and by using statistic information.

The solution according to the implementations of the present application can be applied to a passive identification scenario. In practice, statistic information calculated based on data of a certain type can be directly provided to a user, so that the user can use the provided statistic information to determine data similar to the certain type. From a user point of view, statistic information of data of a specific type can be obtained. From a program point of view, steps 102 to 110 can be performed to determine data and a field in a database that are of the same type as the data of the specific type.

In the above user passive identification scenario, data volume statistical information of some types are pre-calculated to provide to the user. Therefore, subsequent steps 102 to 110 can be performed on different devices and at different time stages.

Regardless of being applied to the user active identification scenario or the user passive identification scenario, because statistic information-based data identification has a small calculation amount, saves a large amount of calculation resources, consumes short time, and has high efficiency, a data identification process can be quasi real-time.

In at least one implementation of the present application, the method can further include: before the determining the state transition matrices corresponding to the character positions based on the data samples in the second data set, obtaining a given data set, a data type of data samples in the given data set being known; and determining at least one second data set from the given data set, data samples in a same second data set having a same length.

The implementations of the present application can be based on an assumption that data of a same data type is the same or is similar in length distribution. Therefore, when lengths of data samples in a first data set are the same as lengths of data samples in a second data set, whether the first data set and the second data set are data of a same type can be determined.

Therefore, the obtaining the state transition matrix set generated based on the statistics of the data samples in the second data set can include: obtaining a corresponding state transition matrix set based on lengths of the data samples in the first data set, lengths of data samples in the second data set corresponding to the corresponding state transition matrix set being the same as the lengths of the data samples in the first data set.

In some embodiments, from another point of view, the method can further include: before the determining the sample state transition probabilities corresponding to the data samples in the first data set based on the state transition matrix set (step 106), determining that sample lengths of the data samples in the first data set are the same as sample lengths of the data samples in the second data set.

In the above implementations, a sample length is considered before data identification is performed based on state transition statistical information, so that the solution has high fault tolerance. Even if a noise sample exists in a data set, the data identification solution can maintain sufficient robustness.

In at least one implementation of the present application, the determining the sample state transition probabilities corresponding to the data samples in the first data set based on the state transition matrix set (step 106) can include: for the data samples in the first data set, obtaining character state transition probabilities corresponding to character positions in the data samples based on the state transition matrix set; and calculating sample state transition probabilities corresponding to the data samples based on the character state transition probabilities corresponding to the character positions in the data samples. In practice, for each data sample in the first data set, the following is performed: obtaining character state transition probabilities corresponding to character positions in the data sample based on the state transition matrix set; and calculating a sample state transition probability corresponding to the data sample based on the character state transition probabilities corresponding to the character positions in the data sample.

In some embodiments, the obtaining the character state transition probabilities corresponding to the character positions in the data samples based on the state transition matrix set can include: determining a value of a first character at a first character position in the data samples; determining a value of a second character at a next character position of the first character position; determining a first state transition matrix corresponding to the first character position from the state transition matrix set; and obtaining a first state transition probability corresponding to the first character position from the first state transition matrix based on the value of the first character and the value of the second character.

In some embodiments, the calculating the sample state transition probabilities corresponding to the data samples can include: calculating products of the character state transition probabilities corresponding to the character positions in the data samples as the sample state transition probabilities corresponding to the data samples.

In at least one implementation of the present application, the method can further include: before the determining the ratio between the number of the data samples in the first data set whose sample state transition probabilities are greater than the first threshold and the total number of the data samples in the first data set, determining the first threshold, for example, determining state occurrence probabilities corresponding to the data samples in the second data set based on the state transition matrix set; and using a predetermined fractile of the state occurrence probabilities corresponding to the data samples in the second data set as the first threshold. In some embodiments, a 95th fractile of the state occurrence probabilities corresponding to the data samples in the second data set can be used as the first threshold.

In this implementation, the first threshold is used to determine whether a to-be-identified data sample is data of a same type as the data samples in the second data set. In some embodiments, the first threshold can be determined based on manual experience. Preferably, a 95th fractile of sample probabilities of a training set can be selected as the first threshold during an actual operation process, so that threshold setting is more accurate and efficient.

In some implementations, a determining method of the first threshold can include: calculating the sample state transition probability corresponding to each data sample in the second data set based on the state transition matrix set; ranking the obtained sample state transition probabilities corresponding to the data samples; and using a probability value corresponding to a predetermined fractile in a ranking result as the first threshold, for example, using a probability value corresponding to a 95th fractile in the ranking result as the first threshold.

Using a data sample "13912345678" as an example, a calculation process of the sample state transition probability of the data sample is as follows: firstly, determining actual state transition probabilities of numbers at adjacent positions, that is, determining transition probabilities from number 1 to number 3, number 3 to number 9, number 9 to number 1, . . . , and number 7 to number 8 as $p_1$, $p_2$, $p_3$, . . . , and $p_{10}$ in sequence, so that the sample state transition probability of the data sample can be $P=\Pi_{n=1}^{10} p_n$. Assuming that there are 100 similar data samples in the second data set, the sample state transition probabilities of the 100 data samples can be calculated as $P_1$ to $P_{100}$, respectively. Then, a process of determining a probability value corresponding to a 95th fractile as a first threshold is as follows: ranking $P_1$ to $P_{100}$ in a value descending order, using the sample state transition probability of the last data sample in the first 95% of the data samples (in this example, the sample state transition probability of the 95th data sample after ranking) as the 95th fractile (denoted as P(95%)) as the first threshold. As such, in response to that a calculation result of a sample state transition probability of a first data sample in a first data set is greater than the first threshold P(95%), a data type of the first data sample can be determined to be the same as the data type of the data samples in the second data set.

In some implementations, the second threshold can be manually set, for example, to 15%.

In at least one implementation of the present application, the data samples in the second data set can be private data. Therefore, the determining the data corresponding to the to-be-identified field as being of the same data type as the data samples in the second data set can include: determining the data corresponding to the to-be-identified field as private data. For example, the data corresponding to the to-be-identified field can be determined as private data of a same type as the private data in the second data set.

In some implementations, the method can further include: after the determining the data corresponding to the to-be-identified field as the private data, performing anonymization processing on the data corresponding to the to-be-identified field. In some embodiments, a tag for identifying private data can be added to an identified private field based on an identification result; and when data corresponding to the tagged field is accessed, the accessed data can be anonymized.

In the implementations of the present application, a specific type of the private data is not specifically limited, any data that a user wants to identify and protect can be referred to as private data, or can be referred to as sensitive data. For example, the private data can include personal characteristic information (such as a telephone number, an address, and a credit card number), sensitive information (such as a personal health condition, financial information, and an important company file), and the like used to locate or identify an individual, or can include family private data (such as a family annual income), corporate private data, and the like.

The private data can include personal basic information, personal identity information, personal biometric information, network identity information, personal health physiological information, personal education and job information, personal property information, personal communication information, contact information, a personal Internet access record, personal common equipment information, personal location information, and the like.

Personal basic information-based private data can include specific private types such as a personal name, a birth date, a gender, an ethnicity, a nationality, a family relationship, an address, a personal telephone number, and an email. Personal identity information-based private data can include specific private types such as an identity card, a military officer certificate, a passport, a driving license, a work permit, a pass, a social security card, and a residence permit. Personal biometric information-based private data can include specific private types such as a personal gene, a fingerprint, a voiceprint, an eyeprint, a palmprint, an auricle, an iris, and a facial feature. Network identity information-based private data can include specific private types such as a system account number, an IP address, an email address, and a password, an access code, an access code protection answer, and a personal digital certificate that are related thereto. Personal health physiological information-based private data can include specific private types such as a relevant record generated by a personal medical treatment or the like, such as a disease, a hospitalization log, a medical order form, an examination report, a surgery and anesthesia record, a nursing record, a medication record, drug and food allergy information, reproductive information, a past medical history, a diagnosis and treatment condition, a family medical history, a present medical history, and a contagious disease history; other information related to a personal health condition; and a weight, a height, and a vital capacity. Personal education and job information-based private data can include specific privacy types such as a personal occupation, a position, a work unit, an education background, a degree, an education experience, a work experience, a training record, and a report card. Personal property information-based private data can include specific private types such as a bank account number, authentication information (access code), deposit information (including an amount of funds, a payment and receipt record, and the like), house property information, a credit record, credit information, a transaction and consumption record, a turnover record, and virtual property information such as a virtual currency, a virtual transaction, and game redeem code. Personal communication information-based private data can include specific private types such as a communication record and communication content, an SMS message, a multimedia message, an email, and data (commonly referred to as metadata) describing personal communication. Contact information-based private data can include specific private types such as an address book, a friends list, a group list, and an email address list. Personal Internet access record-based private data can refer to an operation record stored by using a log, and can include specific private types such as a website browsing record, a software usage record, and a click record. Personal common equipment information-based private data can refer to information used to describe a basic situation of personal common equipment, and can include specific private types such as a hardware serial number, an equipment media access control (MAC) address, a software list, and a unique equipment identifier (such as IMEI/android ID/IDFA/OPENUDID/GUID or SIM card IMSI information). Personal location information-based private data can include specific private types such as a trajectory, accurate position information, accommodation information, a longitude, and a latitude. In addition, the private data can further include specific private types such as a marriage history, a religious belief, a sexual orientation, and an undisclosed illegal criminal record.

The above listed information is merely examples of private data identifiable in the implementations of the present application, and is not limited to the above examples.

In the solution of the implementations of the present application, transition probability matrices between characters in a data set are extracted, a probability value of a test sample is estimated by using the obtained transition probability matrices, and finally, whether the test sample belongs to a data type desired to be identified is determined by comparing with a threshold.

In practice, the implementations of the present application can be based on the Markov hypothesis:

$$P(X_{n+1}=x|X_1=x_1, \ldots, X_n=x_n)=P(X_{n+1}=x|X_n=x_n) \quad \text{(Equation 1)}$$

In the Markov hypothesis, a probability of a current state is related only to a previous state of the current state. In equation 1, $P(X_{n+1}=x|X_1=x_1, \ldots, X_n=x_n)$ can represent a probability that $X_{n+1}$ is state x when $X_1$ to $X_n$ are states $x_1$ to $x_n$, respectively; and equation $P(X_{n+1}=x|X_n=x_n)$ can represent a probability that $X_{n+1}$ is state x when $X_n$ is state $x_n$.

In equation 1, $X_1$ to $X_n$ can represent time points, and $x_1$ to $x_n$ can represent states corresponding to the time points. In the implementations of the present application, $X_1$ to $X_n$ can represent character positions, and $x_1$ to $x_n$ can represent characters corresponding to the character positions.

For a traditional Markov chain meeting a detailed balance condition, a state transition matrix needs to be the same at any moment. Unlike the traditional Markov chain, in the implementations of the present application, probabilities for state transition between different positions are considered to be different. For example, for identity card-based data, in a state transition condition from the 7th position to the 8th position, transition probabilities from state "1" to state "9" and from state "2" to state "0" are much greater than transition probabilities between other states. As such, in the implementations of the present application, for any position of a data sample, a corresponding state transition matrix needs to be calculated. The solution of the present application can better use the Markov hypothesis for data identification in view of variations in detail at different positions.

Based on the above setting, an occurrence probability of a given state sequence $S=\{s_1, s_2, \ldots, s_n\}$ can be defined as follows:

$$P(s_1, s_2, \ldots, s_n) = \prod_{i=1}^{n-1} P_{s_i \to s_{i+1}} \quad \text{(Equation 2)}$$

$P_{s_i \to s_{i+1}}$ can represent a state transition probability from state $s_i$ to state $s_{i+1}$. The state transition probability can be solved by using maximum likelihood estimation:

$$P_{s_i \to s_{i+1}} = \frac{\text{Count}(s_i \to s_{i+1})}{\sum_{i \in S} \sum_{j \in S} \text{Count}(s_i \to s_j)} \quad \text{(Equation 3)}$$

For certain sample space, probabilities of various state transition conditions in the sample space can be solved based on the maximum likelihood estimation. In equation 3, S can represent a character list corresponding to sample space, $\text{Count}(s_i \to s_j)$ can represent a number of state transition conditions from specified state $s_i$ to any state $s_j$, $\sum_{i \in S} \sum_{j \in S} \text{Count}(s_i \to s_j)$ can represent a statistical number of state transition conditions from specified state $s_i$ to all states, and Count($s_i \rightarrow s_{i+1}$) can represent a number of state transition conditions from specified state $s_i$ to another specified state $s_{i+1}$.

Figure 2:
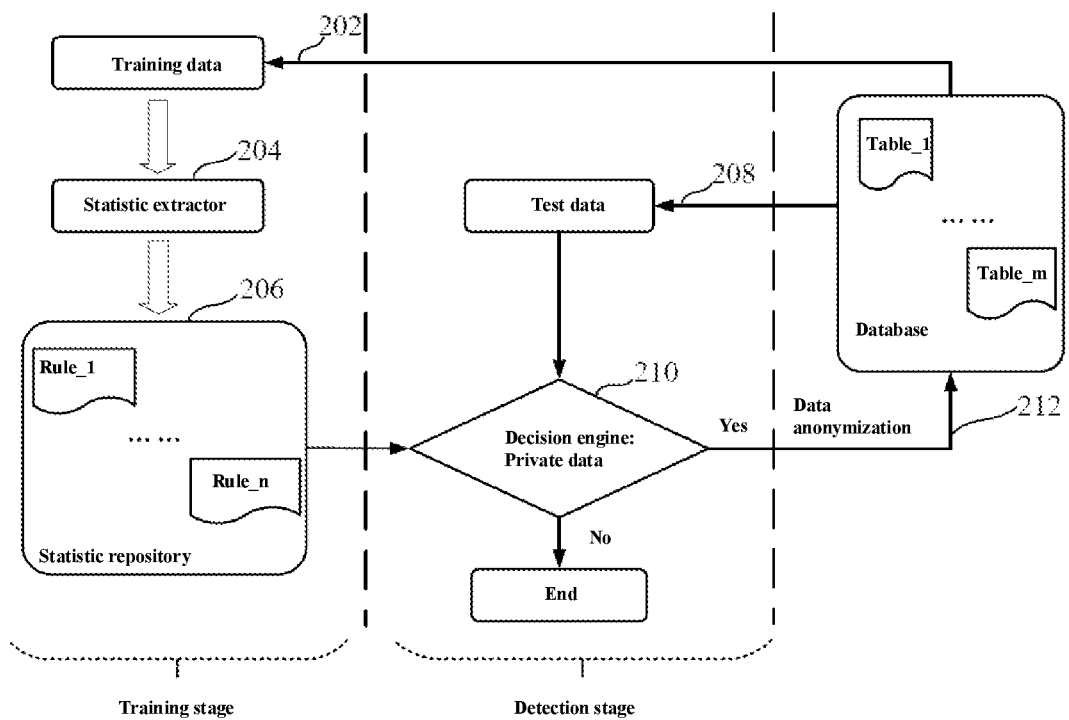
FIG. 2 is a schematic principle diagram illustrating a data identification method according to an implementation of the present specification.

FIG. 2 is a schematic principle diagram illustrating an example implementation of a data identification method according to an implementation of the present specification. As shown in FIG. 2, in at least one implementation of the present application, a solution can include a training stage and a detection stage.

At the training stage: Step 202. Obtain training data samples given by a user.

Step 204. Extract statistic information specific to the training data samples by using a statistic extractor.

For example, a state set can be pre-given, that is, a character list is given, and probability statistics is subsequently collected based on the character list. Training data samples A given by a user can be classified based on lengths, and samples with an equal length are classified into one type. Then, statistics about type $A_n$ (where n represents a length of data samples in the type) can be collected. For any position $j \in [1, n-1]$, a state transition matrix belonging to the position can be calculated based on equation (3) to finally obtain state transition matrix set $P_{A_n} = \{P_1, P_2, \ldots, P_{n-1}\}$.

Step 206. In some embodiments, store the extracted statistic information to a statistic repository. At the training stage of the implementations of the present application, the obtained training data samples given by the user can be private data samples. As shown in FIG. 2, in some implementations, a rule_1 to a rule_n stored in the statistic repository can correspond to statistic information obtained based on different private data types.

It should be noted that the implementation of the present application provides an unsupervised data identification solution without manual sample labeling. The training stage herein is different from a process of training a multi-classification model based on a labeled sample in the existing technologies. In the implementation of the present application, the training stage consumes less time and less calculation resources, and can be performed with the subsequent detection stage on a same or different devices.

At the detection stage: Step 208. Traverse each field in a database or each field in a user-specified range, and sample a certain amount of data samples under a test field.

Step 210. Extract a stored state transition matrix set from the statistic repository, and estimate a probability of a test sample based on data in the state transition matrix set. In some embodiments, the probability can be calculated by using equation (2) described above. The test sample is identified as data of a same type as training data given by the user in response to that the probability of the test sample is greater than the first threshold; and the test field is determined as a field of a same type as the training data given by the user in response to that a proportion of data identified as being of a same type as the training data given by the user in all test samples reaches the second threshold, that is, all data corresponding to the field is considered to be data of a same type as the training data given by the user. In some implementations, when data given by a user is private data, data identified in step 210 is private data, and an identified field is a private field.

In an actual application process, private data protection can be roughly divided into two parts. First, a private data field in a database needs to be identified first. Then, the identified private data field is encrypted in various ways to effectively prevent private data from being leaked.

As shown in FIG. 2, the private data protection solution can further include: Step 212. Anonymize identified private data.

In some implementations, a predetermined data anonymization method can include: masking at least a part of characters in the private data; replacing the private data with a hash value of the private data; or keeping a data length unchanged, and replacing at least a part of characters of the private data. This is not limited thereto. In some embodiments, private data of different types can be anonymized by using different anonymization methods.

Figure 3:
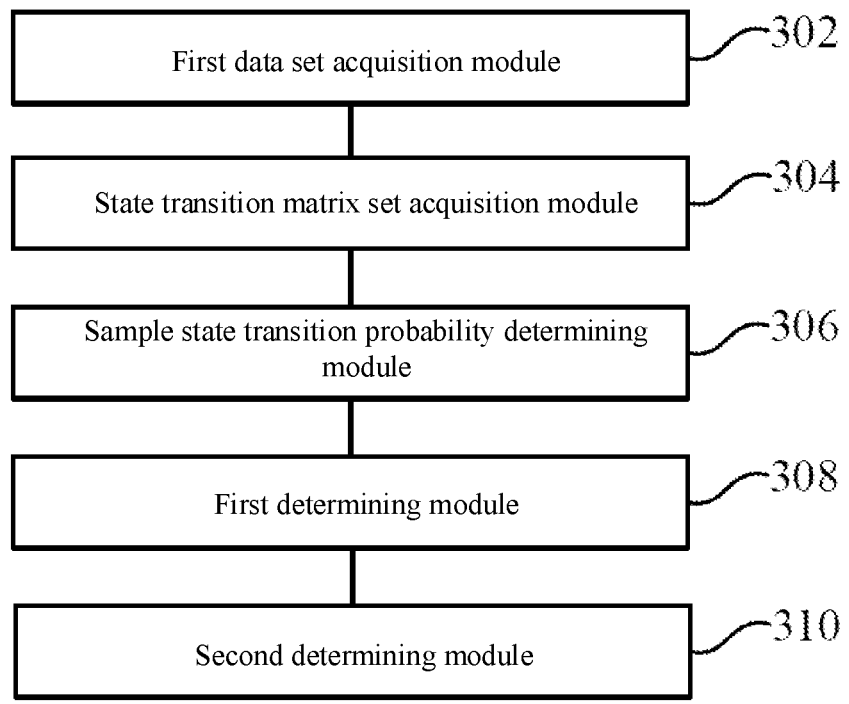
FIG. 3 is a schematic structural diagram illustrating a data identification apparatus corresponding to FIG. 1 according to an implementation of the present specification.

Based on a same idea, an implementation of the present specification further provides an apparatus corresponding to the above method. FIG. 3 is a schematic structural diagram illustrating a data identification apparatus corresponding to FIG. 1 according to an implementation of the present specification. As shown in FIG. 3, the apparatus can include: a first data set acquisition module 302, configured to obtain a first data set, data samples in the first data set being at least a part of data of a to-be-identified field; a state transition matrix set acquisition module 304, configured to obtain a state transition matrix set generated based on statistics of data samples in a second data set, a data type of the data samples in the second data set being known, the state transition matrix set including a plurality of state transition matrices, and one state transition matrix thereof being used to represent probabilities of various state transition conditions of a value of a first character at one character position relative to a value of a second character at a next character position of the one character position in the data samples in the second data set; a sample state transition probability determining module 306, configured to determine sample state transition probabilities corresponding to the data samples in the first data set based on the state transition matrix set, the sample state transition probabilities representing a similarity between a data type of the corresponding data samples and the data type of the data samples in the second data set; a first determining module 308, configured to determine a ratio between a number of data samples in the first data set whose sample state transition probabilities are greater than a first threshold and a total number of the data samples in the first data set; and a second determining module 310, configured to determine data corresponding to the to-be-identified field as being of a same data type as the data samples in the second data set in response to that the ratio is greater than a second threshold.

Based on the apparatus in FIG. 3, an implementation of the present specification further provides some example implementation solutions of the apparatus, which are described below.

In at least one implementation of the present application, the apparatus can further include: a state transition matrix set generation module, configured to determine state transition matrices corresponding to character positions based on the data samples in the second data set to obtain the state transition matrix set.

In some embodiments, the apparatus can further include: a second data set determining module, configured to: before the state transition matrices corresponding to the character positions are determined based on the data samples in the second data set, obtain a given data set, a data type of data samples in the given data set being known; and determine at least one second data set from the given data set, data samples in a same second data set having a same length.

Correspondingly, the state transition matrix set acquisition module 304 can be configured to obtain a corresponding state transition matrix set based on lengths of the data samples in the first data set, lengths of data samples in the second data set corresponding to the corresponding state transition matrix set being the same as the lengths of the data samples in the first data set.

In at least one implementation of the present application, the apparatus can further include: a length comparison module, configured to: before the sample state transition probabilities corresponding to the data samples in the first data set are determined based on the state transition matrix set, determine that sample lengths of the data samples in the first data set are the same as sample lengths of the data samples in the second data set.

In at least one implementation of the present application, the sample state transition probability determining module 306 can include: a character state transition probability acquisition unit, configured to: for the data samples in the first data set, obtain character state transition probabilities corresponding to character positions in the data samples based on the state transition matrix set; and a sample state transition probability calculation unit, configured to calculate sample state transition probabilities corresponding to the data samples based on the character state transition probabilities corresponding to the character positions in the data samples.

In some embodiments, the character state transition probability acquisition unit can be configured to: determine a value of a first character at a first character position in the data samples, determine a value of a second character at a next character position of the first character position, determine a first state transition matrix corresponding to the first character position from the state transition matrix set, and obtain a first state transition probability corresponding to the first character position from the first state transition matrix based on the value of the first character and the value of the second character.

In some embodiments, the sample state transition probability calculation unit can be configured to calculate products of the character state transition probabilities corresponding to the character positions in the data samples as the sample state transition probabilities corresponding to the data samples.

In at least one implementation of the present application, the apparatus can further include: a first threshold determining module, configured to: determine state occurrence probabilities corresponding to the data samples in the second data set based on the state transition matrix set, and use a predetermined fractile of the state occurrence probabilities corresponding to the data samples in the second data set as the first threshold.

In at least one implementation of the present application, the data samples in the second data set are private data, and correspondingly, the second determining module 310 is configured to determine the data corresponding to the to-be-identified field as private data.

In at least one implementation of the present application, the apparatus can further include: an anonymization module, configured to: after the data corresponding to the to-be-identified field is determined as the private data, anonymize the data corresponding to the to-be-identified field.

It can be understood that, each of the above modules is a computer program or program segment for performing a certain function or a plurality of functions. Moreover, distinction between the above modules does not mean that actual program code also needs to be separated.

Based on a same idea, an implementation of the present specification further provides a device corresponding to the above method.

Figure 4:
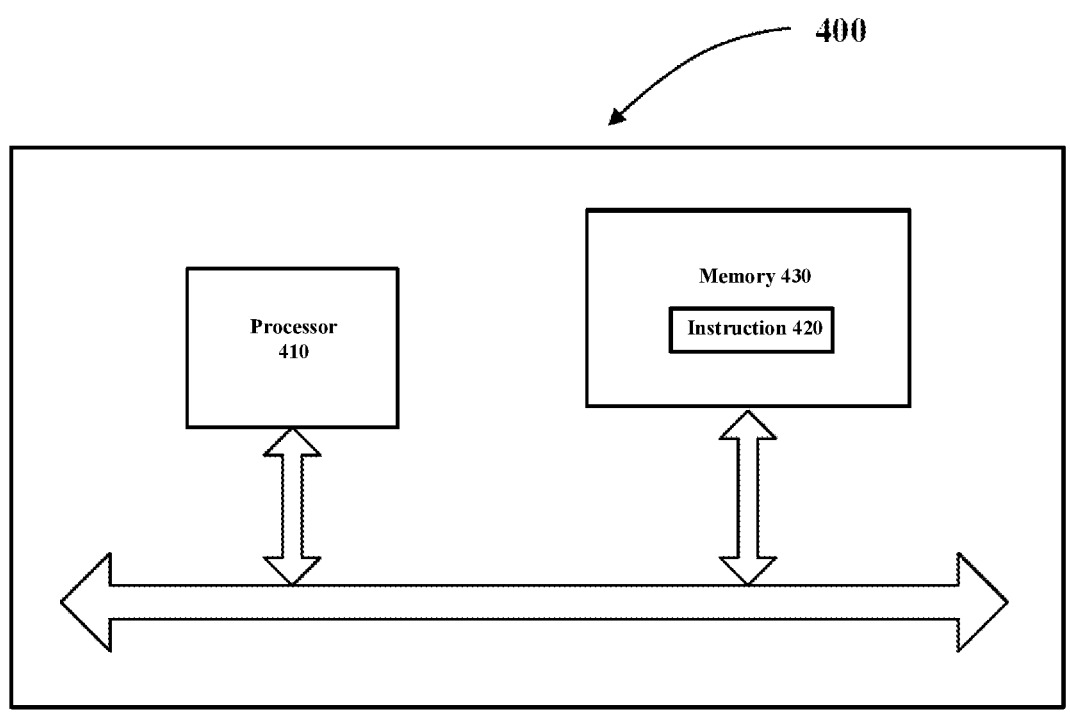
FIG. 4 is a schematic structural diagram illustrating a data identification device corresponding to FIG. 1 according to an implementation of the present specification.

FIG. 4 is a schematic structural diagram illustrating a data identification device 400 corresponding to FIG. 1 according to an implementation of the present specification. As shown in FIG. 4, the device 400 can include: at least one processor 410; and a memory 430 communicatively connected to the at least one processor, the memory 430 storing an instruction 420 that can be executed by the at least one processor 410, and the instruction being executed by the at least one processor 410 so that the at least one processor 410 can: obtain a first data set, data samples in the first data set being at least a part of data of a to-be-identified field; obtain a state transition matrix set generated based on statistics of data samples in a second data set, a data type of the data samples in the second data set being known, the state transition matrix set including a plurality of state transition matrices, and one state transition matrix thereof being used to represent probabilities of various state transition conditions of a value of a first character at one character position relative to a value of a second character at a next character position of the one character position in the data samples in the second data set; determine sample state transition probabilities corresponding to the data samples in the first data set based on the state transition matrix set, the sample state transition probabilities representing a similarity between a data type of the corresponding data samples and the data type of the data samples in the second data set; determine a ratio between a number of data samples in the first data set whose sample state transition probabilities are greater than a first threshold and a total number of the data samples in the first data set; and determine data corresponding to the to-be-identified field as being of a same data type as the data samples in the second data set in response to that the ratio is greater than a second threshold.

Based on a same idea, an implementation of the present specification further provides a computer-readable medium corresponding to the above method. The computer-readable medium stores a computer-readable instruction, and the computer-readable instruction can be executed by a processor to implement the following method: obtaining a first data set, data samples in the first data set being at least a part of data of a to-be-identified field; obtaining a state transition matrix set generated based on statistics of data samples in a second data set, a data type of the data samples in the second data set being known, the state transition matrix set including a plurality of state transition matrices, and one state transition matrix thereof being used to represent probabilities of various state transition conditions of a value of a first character at one character position relative to a value of a second character at a next character position of the one character position in the data samples in the second data set; determining sample state transition probabilities corresponding to the data samples in the first data set based on the state transition matrix set, the sample state transition probabilities representing a similarity between a data type of the corresponding data samples and the data type of the data samples in the second data set; determining a ratio between a number of data samples in the first data set whose sample state transition probabilities are greater than a first threshold and a total number of the data samples in the first data set; and determining data corresponding to the to-be-identified field as being of a same data type as the data samples in the second data set in response to that the ratio is greater than a second threshold.

The example implementations of the present specification are described above. In some cases, the actions or steps described in the claims can be performed in an order different from the order in the implementations and can still achieve the desired results. In addition, the process depicted in the accompanying drawings does not necessarily require a specific order or consecutive order to achieve the desired results. In some implementations, multi-task processing and parallel processing can or may be advantageous.

The implementations in the present specification are described in a progressive way. For same or similar parts of the implementations, mutual references can be made to the implementations. Each implementation focuses on a difference from other implementations.

The apparatus and the device provided in the implementations of the present specification correspond to the method. Therefore, the apparatus and the device also have beneficial technical effects that are similar to those of the corresponding method. Because the beneficial technical effects of the method have been described in detail above, the beneficial technical effects of the corresponding apparatus and device details are omitted here for simplicity.

In the 1990s, whether technology improvement was hardware improvement (for example, improvement of a circuit structure, such as a diode, a transistor, or a switch) or software improvement (improvement of a method procedure) could be clearly distinguished. However, with the development of technologies, current improvement for many method procedures can be considered as direct improvement of hardware circuit structures. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used. A person skilled in the art should also be aware that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the ASIC, the programmable logic controller, and the embedded microcontroller. Therefore, the controller can be considered as a hardware component, and an apparatus configured to implement various functions in the controller can also be considered as a structure in the hardware component. Alternatively, the apparatus for implementing various functions can even be considered as both a software module for implementing a method and the structure within the hardware component.

The system, apparatus, module, or unit illustrated in the above implementations can be implemented by using a computer chip or an entity, or can be implemented by using a product having a certain function. A typical implementation device is a computer. The computer can be, for example, a personal computer, a laptop computer, a cellular phone, a camera phone, an intelligent phone, a personal digital assistant, a media player, a navigation device, an email transceiver device, a game console, a tablet computer, a wearable device, or any combination thereof.

For ease of description, the above apparatus is divided into various units based on functions for separate description. Certainly, during implementation of the present application, the functions of the units can be implemented in one or more pieces of software and/or hardware.

A person skilled in the art should understand that the implementations of the present specification can be provided as a method, a system, or a computer program product. Therefore, the present technology can use a form of hardware only implementations, software only implementations, or implementations combining software and hardware. Moreover, the present technology can use a form of a computer program product that is implemented on one or more computer-usable storage media (including but not limited to a magnetic disk memory, a CD-ROM, an optical memory, and the like) that include computer-usable program code.

The present technology is described with reference to the flowcharts and/or block diagrams of the method, the device (system), and the computer program product according to the implementations of the present technology. It should be understood that each procedure and/or each block in the flowcharts and/or the block diagrams and a combination of a procedure and/or a block in the flowcharts and/or block diagrams can be implemented by using computer program instructions. These computer program instructions can be provided to a processor of a general-purpose computer, a special-purpose computer, an embedded processor, or another programmable data processing device to produce a machine, so that the instructions executed by the processor of the computer or another programmable data processing device produce an apparatus for implementing functions specified in one or more procedures in the flowcharts and/or one or more blocks in the block diagrams.

These computer program instructions can also be stored in a computer-readable memory that can direct a computer or another programmable data processing device to operate in a specific way, so that the instructions stored in the computer-readable memory produce an article of manufacture including an instruction apparatus, and the instruction apparatus implements functions specified in one or more procedures in the flowcharts and/or one or more blocks in the block diagrams.

These computer program instructions can also be loaded onto a computer or another programmable data processing device, so that a series of operation steps are performed on the computer or another programmable device to perform computer-implemented processing, and thus the instructions executed on the computer or another programmable device provide steps for implementing functions specified in one or more procedures in the flowcharts and/or one or more blocks in the block diagrams.

In a typical configuration, a computing device includes one or more processors (CPUs), an input/output interface, a network interface, and a memory.

The memory can include a non-persistent memory, a random access memory (RAM), and/or a non-volatile memory in a computer-readable medium, such as a read-only memory (ROM) or a flash RAM. The memory is an example of the computer-readable medium.

The computer-readable medium includes persistent, non-persistent, movable, and unmovable media that can store information by using any method or technology. The information can be a computer-readable instruction, a data structure, a program module, or other data. Examples of storage media of a computer include, but are not limited to, a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a magnetic cassette tape, a magnetic disk storage or another magnetic storage device, or any other non-transmission medium, and can be configured to store information accessible to a computing device. Based on the definition in the present specification, the computer-readable medium does not include transitory media such as a modulated data signal and carrier.

It should also be noted that the term "include", "comprise", or any other variant thereof is intended to cover a non-exclusive inclusion, so that a process, method, commodity, or device that includes a series of elements not only includes those elements but also includes other elements that are not expressly listed, or further includes elements inherent to such a process, method, commodity, or device. An element preceded by "includes a . . . " does not, without more constraints, preclude the presence of additional identical elements in the process, method, commodity, or device that includes the element.

A person skilled in the art should understand that the implementations of the present application can be provided as a method, a system, or a computer program product. Therefore, the present application can use a form of hardware only implementations, software only implementations, or implementations combining software and hardware. Moreover, the present application can use a form of a computer program product that is implemented on one or more computer-usable storage media (including but not limited to a magnetic disk memory, a CD-ROM, an optical memory, and the like) that include computer-usable program code.

The present application can be described in common contexts of computer-executable instructions executed by a computer, such as a program module. Generally, the program module includes a routine, program, object, component, data structure, and the like for executing a particular task or implementing a particular abstract data type. Alternatively, the present application can be practiced in distributed computing environments. In these distributed computing environments, tasks are executed by remote processing devices that are connected by using a communications network. In a distributed computing environment, program modules can be located in both local and remote computer storage media including storage devices.

The above descriptions are merely implementations of the present application and are not intended to limit the present application. For a person skilled in the art, the present application can have various modifications and variations. Any modification, equivalent replacement, improvement, and the like that are made within the spirit and principles of the present application shall all be included within the scope of the claims of the present application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A data identification method, comprising:
obtaining a first data set, data samples in the first data set correspond to a to-be-identified field;
obtaining a state transition matrix set generated based on statistics of data samples in a second data set, wherein the state transition matrix set includes a plurality of state transition matrices, and at least one of the plurality of state transition matrices represents probabilities of state transition conditions of a value of a first character at a character position relative to a value of a second character at a next character position relative to the character position in the data samples in the second data set;
determining sample state transition probabilities corresponding to the data samples in the first data set based on the state transition matrix set, the sample state transition probabilities representing a similarity between a data type of the data samples in the first data set and the data type of the data samples in the second data set;
determining a ratio between (a) a number of data samples in the first data set whose sample state transition probabilities are greater than a first threshold and (b) a total number of the data samples in the first data set; and
determining data corresponding to the to-be-identified field as being of a same data type as the data samples in the second data set in response to determining that the ratio is greater than a second threshold.

2. The method according to claim 1, further comprising:
determining state transition matrices corresponding to character positions based on the data samples in the second data set to obtain the state transition matrix set.

3. The method according to claim 2, further comprising:
obtaining a given data set; and
determining at least one base data set from the given data set, wherein data samples in a same base data set have a same length and the at least one base data set includes the second data set.

4. The method according to claim 1, further comprising:
before the determining the sample state transition probabilities corresponding to the data samples in the first data set based on the state transition matrix set, determining that sample lengths of the data samples in the first data set are the same as sample lengths of the data samples in the second data set.

5. The method according to claim 1, wherein the determining the sample state transition probabilities corresponding to the data samples in the first data set based on the state transition matrix set includes:
for the data samples in the first data set, obtaining character state transition probabilities corresponding to character positions in the data samples based on the state transition matrix set; and
calculating the sample state transition probabilities corresponding to the data samples based on the character state transition probabilities corresponding to the character positions in the data samples.

6. The method according to claim 5, wherein the obtaining the character state transition probabilities corresponding to the character positions in the data samples based on the state transition matrix set includes:
determining a value of a first character at a first character position in the data samples;
determining a value of a second character at a next character position relative to the first character position;
determining a first state transition matrix corresponding to the first character position from the state transition matrix set; and
obtaining a first state transition probability corresponding to the first character position from the first state transition matrix based on the value of the first character and the value of the second character.

7. The method according to claim 5, wherein the calculating the sample state transition probabilities corresponding to the data samples based on the character state transition probabilities corresponding to the character positions in the data samples includes:
calculating at least a product of the character state transition probabilities corresponding to the character positions in the data samples.

8. The method according to claim 1, further comprising:
determining state occurrence probabilities corresponding to the data samples in the second data set based on the state transition matrix set; and
using a fractile of the state occurrence probabilities corresponding to the data samples in the second data set as the first threshold.

9. The method according to claim 1, wherein the data samples in the second data set are private data, and the determining the data corresponding to the to-be-identified field as being of the same data type as the data samples in the second data set includes: determining the data corresponding to the to-be-identified field as private data.

10. The method according to claim 9, further comprising:
after the determining the data corresponding to the to-be-identified field as the private data, anonymizing the data corresponding to the to-be-identified field.

11. A non-transitory computer readable medium storing contents that, when executed by one or more processors, cause the one or more processors to perform actions comprising:
obtaining a first data set, data samples in the first data set correspond to a to-be-identified field;
obtaining a state transition matrix set generated based on statistics of data samples in a second data set, wherein the state transition matrix set includes a plurality of state transition matrices, and at least one of the plurality of state transition matrices represents probabilities of state transition conditions of a value of a first character at a character position relative to a value of a second character at a next character position relative to the character position in the data samples in the second data set;
determining sample state transition probabilities corresponding to the data samples in the first data set based on the state transition matrix set, the sample state transition probabilities representing a similarity between a data type of the data samples in the first data set and the data type of the data samples in the second data set;
determining a ratio between (a) a number of data samples in the first data set whose sample state transition probabilities are greater than a first threshold and (b) a total number of the data samples in the first data set; and
determining data corresponding to the to-be-identified field as being of a same data type as the data samples in the second data set in response to determining that the ratio is greater than a second threshold.

12. The computer readable medium according to claim 11, the actions further comprising:
determining state transition matrices corresponding to character positions based on the data samples in the second data set to obtain the state transition matrix set.

13. The computer readable medium according to claim 12, the actions further comprising:
obtaining a given data set; and
determining at least one base data set from the given data set, wherein data samples in a same base data set have a same length and the at least one base data set includes the second data set.

14. The computer readable medium according to claim 11, the actions further comprising:
before the determining the sample state transition probabilities corresponding to the data samples in the first data set based on the state transition matrix set, determining that sample lengths of the data samples in the first data set are the same as sample lengths of the data samples in the second data set.

15. The computer readable medium according to claim 11, wherein the determining the sample state transition probabilities corresponding to the data samples in the first data set based on the state transition matrix set includes:
for the data samples in the first data set, obtaining character state transition probabilities corresponding to character positions in the data samples based on the state transition matrix set; and
calculating the sample state transition probabilities corresponding to the data samples based on the character state transition probabilities corresponding to the character positions in the data samples.

16. The computer readable medium according to claim 15, wherein the obtaining the character state transition probabilities corresponding to the character positions in the data samples based on the state transition matrix set includes:
- determining a value of a first character at a first character position in the data samples;
- determining a value of a second character at a next character position relative to the first character position;
- determining a first state transition matrix corresponding to the first character position from the state transition matrix set; and
- obtaining a first state transition probability corresponding to the first character position from the first state transition matrix based on the value of the first character and the value of the second character.

17. The computer readable medium according to claim 15, wherein the calculating the sample state transition probabilities corresponding to the data samples based on the character state transition probabilities corresponding to the character positions in the data samples includes:
- calculating at least a product of the character state transition probabilities corresponding to the character positions in the data samples.

18. The computer readable medium according to claim 11, the actions further comprising:
- determining state occurrence probabilities corresponding to the data samples in the second data set based on the state transition matrix set; and
- using a fractile of the state occurrence probabilities corresponding to the data samples in the second data set as the first threshold.

19. The computer readable medium according to claim 11, wherein the data samples in the second data set are private data, and the determining the data corresponding to the to-be-identified field as being of the same data type as the data samples in the second data set includes: determining the data corresponding to the to-be-identified field as private data.

20. The computer readable medium according to claim 19, the actions further comprising:
- after the determining the data corresponding to the to-be-identified field as the private data, anonymizing the data corresponding to the to-be-identified field.

21. A system, comprising:
- one or more processors; and
- memory storing contents that, when executed by the one or more processors, cause the system to perform actions comprising:
  - obtaining a first data set, data samples in the first data set correspond to a to-be-identified field;
  - obtaining a state transition matrix set generated based on statistics of data samples in a second data set, wherein the state transition matrix set includes a plurality of state transition matrices, and at least one of the plurality of state transition matrices represents probabilities of state transition conditions of a value of a first character at a character position relative to a value of a second character at a next character position relative to the character position in the data samples in the second data set;
  - determining sample state transition probabilities corresponding to the data samples in the first data set based on the state transition matrix set, the sample state transition probabilities representing a similarity between a data type of the data samples in the first data set and the data type of the data samples in the second data set;
  - determining a ratio between (a) a number of data samples in the first data set whose sample state transition probabilities are greater than a first threshold and (b) a total number of the data samples in the first data set; and
  - determining data corresponding to the to-be-identified field as being of a same data type as the data samples in the second data set in response to determining that the ratio is greater than a second threshold.

22. The system according to claim 21, the actions further comprising:
- determining state transition matrices corresponding to character positions based on the data samples in the second data set to obtain the state transition matrix set.

23. The system according to claim 22, the actions further comprising:
- obtaining a given data set; and
- determining at least one base data set from the given data set, wherein data samples in a same base data set have a same length and the at least one base data set includes the second data set.

24. The system according to claim 21, the actions further comprising:
- before the determining the sample state transition probabilities corresponding to the data samples in the first data set based on the state transition matrix set, determining that sample lengths of the data samples in the first data set are the same as sample lengths of the data samples in the second data set.

25. The system according to claim 21, wherein the determining the sample state transition probabilities corresponding to the data samples in the first data set based on the state transition matrix set includes:
- for the data samples in the first data set, obtaining character state transition probabilities corresponding to character positions in the data samples based on the state transition matrix set; and
- calculating the sample state transition probabilities corresponding to the data samples based on the character state transition probabilities corresponding to the character positions in the data samples.

26. The system according to claim 25, wherein the obtaining the character state transition probabilities corresponding to the character positions in the data samples based on the state transition matrix set includes:
- determining a value of a first character at a first character position in the data samples;
- determining a value of a second character at a next character position relative to the first character position;
- determining a first state transition matrix corresponding to the first character position from the state transition matrix set; and
- obtaining a first state transition probability corresponding to the first character position from the first state transition matrix based on the value of the first character and the value of the second character.

27. The system according to claim 25, wherein the calculating the sample state transition probabilities corresponding to the data samples based on the character state transition probabilities corresponding to the character positions in the data samples includes:
- calculating at least a product of the character state transition probabilities corresponding to the character positions in the data samples.

28. The system according to claim 21, the actions further comprising:
- determining state occurrence probabilities corresponding to the data samples in the second data set based on the state transition matrix set; and
- using a fractile of the state occurrence probabilities corresponding to the data samples in the second data set as the first threshold.

29. The system according to claim 21, wherein the data samples in the second data set are private data, and the determining the data corresponding to the to-be-identified field as being of the same data type as the data samples in the second data set includes: determining the data corresponding to the to-be-identified field as private data.

30. The system according to claim 29, the actions further comprising:
- after the determining the data corresponding to the to-be-identified field as the private data, anonymizing the data corresponding to the to-be-identified field.

* * * * *